United States Patent
Lynch

(10) Patent No.: US 9,697,175 B2
(45) Date of Patent: Jul. 4, 2017

(54) METHOD AND APPARATUS FOR PROVIDING CURVATURE TRANSFORMATION FOR COMPARISON, COMPUTATION AND AGGREGATION

(71) Applicant: HERE Global B.V., Veldhoven (NL)

(72) Inventor: James D. Lynch, Chicago, IL (US)

(73) Assignee: HERE Global B.V., Veldhoven (NL)

( * ) Notice: Subject to any disclaimer, the term of this patent is extended or adjusted under 35 U.S.C. 154(b) by 202 days.

(21) Appl. No.: 14/578,791

(22) Filed: Dec. 22, 2014

(65) Prior Publication Data

US 2016/0179749 A1 Jun. 23, 2016

(51) Int. Cl.
*G06F 17/10* (2006.01)
*G05D 1/02* (2006.01)

(52) U.S. Cl.
CPC .............. *G06F 17/10* (2013.01); *G05D 1/02* (2013.01)

(58) Field of Classification Search
None
See application file for complete search history.

(56) References Cited

U.S. PATENT DOCUMENTS

| | | | | |
|---|---|---|---|---|
| 2008/0188763 A1* | 8/2008 | John | ..................... | A61B 5/0452 600/516 |
| 2015/0358646 A1* | 12/2015 | Mertens | ................ | H04N 1/6058 382/166 |
| 2016/0179749 A1* | 6/2016 | Lynch | ..................... | G06F 17/10 708/400 |

OTHER PUBLICATIONS

Paul J. Carlson et al., "Comparison of Radius Estimating Techniques for Horizontal Curves", posted online on Dec. 28, 2006, retrieved on Mar. 23, 2015, from https://ceprofs.tamu.edu/mburris/Papers/TRR%201918%20-%20COMPARISON%20OF%20RADIUS%20ESTIMATING%20TECHNIQUES%20FOR%20HORIZONTAL%20CURVES.pdf, pp. 1-8.

* cited by examiner

*Primary Examiner* — David H Malzahn
(74) *Attorney, Agent, or Firm* — Ditthavong & Steiner, P.C.

(57) ABSTRACT

An approach is provided for transforming curvature values into bin values for comprehensible description. The approach involves causing, at least in part, an application of at least one transformation function to one or more data values to transform the one or more data values into one or more bin values. The approach also involves causing, at least in part, a binning of the one or more bin values into one or more respective bins based, at least in part, on the one or more continuous bin values. The approach further involves processing and/or facilitating a processing of the one or more bin values in the respective one or more bins to determine statistical information for the respective one or more bins. The approach also involves causing, at least in part, a re-transformation of the statistical information, the one or more bin values, or a combination thereof into the one or more data values following the determination of the statistical information.

20 Claims, 16 Drawing Sheets

START → DETERMINE AN INTEGER PORTION OF THE ONE OR MORE BIN VALUES (401) → DETERMINE A FLOATING VALUE PORTION OF THE ONE OR MORE BIN VALUES (403) → PROCESS AND/OR FACILITATE A PROCESSING OF THE FLOATING VALUE PORTION TO DETERMINE THE STATISTICAL INFORMATION (405) → END

FIG. 7C

| Bin | Radius Of Curvature 10^[(24-Abs(Bin))/6] * sign(Bin) |
|---|---|
| 17 | 15 |
| 16 | 22 |
| 15 | 32 |
| 14 | 46 |
| 13 | 68 |
| 12 | 100 |
| 11 | 147 |
| 10 | 215 |
| 9 | 316 |
| 8 | 464 |
| 7 | 681 |
| 6 | 1000 |
| 5 | 1468 |
| 4 | 2154 |
| 3 | 3162 |
| 2 | 4642 |
| 1 | 6813 |
| 0 | 10000 |
| 0 | -10000 |
| -1 | -6813 |
| -2 | -4642 |
| -3 | -3162 |
| -4 | -2154 |
| -5 | -1468 |
| -6 | -1000 |
| -7 | -681 |
| -8 | -464 |
| -9 | -316 |
| -10 | -215 |
| -11 | -147 |
| -12 | -100 |
| -13 | -68 |
| -14 | -46 |
| -15 | -32 |
| -16 | -22 |
| -17 | -15 |

FIG. 7D

| Radius of Curvature | Bin (continuous) 24 - 6* LOG(R) |
|---|---|
| 10 | 18.0000 |
| 20 | 16.1938 |
| 50 | 13.8062 |
| 100 | 12.0000 |
| 500 | 7.8062 |
| 2000 | 4.1938 |
| 3000 | 3.1373 |
| 5000 | 1.8062 |
| 10000 | 0.0000 |
| -5000 | -1.8062 |
| -700 | -6.9294 |
| -300 | -9.1373 |
| -100 | -12.0000 |
| -50 | -13.8062 |
| -15 | -16.9435 |
| -5 | -19.8062 |
| -2 | -22.1938 |

METHOD AND APPARATUS FOR PROVIDING CURVATURE TRANSFORMATION FOR COMPARISON, COMPUTATION AND AGGREGATION

BACKGROUND

Service providers and device manufacturers (e.g., wireless, cellular, etc.) are continually challenged to deliver value and convenience to consumers by, for example, providing compelling network services. One area of interest has been implementation of sensors-based services to sense road details, for example, real-time calculation of curvature values since critical driving maneuvers occurs more on the curves. However, service providers are continually challenged to deliver value and convenience to consumers by, for example, providing accurate and reliable calculation of curvature values to autonomous vehicles encountering varied road curvatures because of the sensitivity and non-linear characteristics of curvatures.

Some Example Embodiments

Therefore, there is a need for an approach for transforming curvature values into bin values for comprehensible description.

According to one embodiment, a method comprises causing, at least in part, an application of at least one transformation function to one or more data values to transform the one or more data values into one or more bin values. The method also comprises causing, at least in part, a binning of the one or more bin values into one or more respective bins based, at least in part, on the one or more continuous bin values. The method further comprises processing and/or facilitating a processing of the one or more bin values in the respective one or more bins to determine statistical information for the respective one or more bins. The method also comprises causing, at least in part, a re-transformation of the statistical information, the one or more bin values, or a combination thereof into the one or more data values following the determination of the statistical information.

According to another embodiment, an apparatus comprises at least one processor, and at least one memory including computer program code for one or more computer programs, the at least one memory and the computer program code configured to, with the at least one processor, cause, at least in part, the apparatus to cause, at least in part, an application of at least one transformation function to one or more data values to transform the one or more data values into one or more bin values. The apparatus is also caused to cause, at least in part, a binning of the one or more bin values into one or more respective bins based, at least in part, on the one or more continuous bin values. The apparatus is further caused to process and/or facilitate a processing of the one or more bin values in the respective one or more bins to determine statistical information for the respective one or more bins. The apparatus is also caused to cause, at least in part, a re-transformation of the statistical information, the one or more bin values, or a combination thereof into the one or more data values following the determination of the statistical information.

According to another embodiment, a computer-readable storage medium carries one or more sequences of one or more instructions which, when executed by one or more processors, cause, at least in part, an apparatus to cause, at least in part, an application of at least one transformation function to one or more data values to transform the one or more data values into one or more bin values. The apparatus is also caused to cause, at least in part, a binning of the one or more bin values into one or more respective bins based, at least in part, on the one or more continuous bin values. The apparatus is further caused to process and/or facilitate a processing of the one or more bin values in the respective one or more bins to determine statistical information for the respective one or more bins. The apparatus is also caused to cause, at least in part, a re-transformation of the statistical information, the one or more bin values, or a combination thereof into the one or more data values following the determination of the statistical information.

According to another embodiment, an apparatus comprises means for causing, at least in part, an application of at least one transformation function to one or more data values to transform the one or more data values into one or more bin values. The apparatus also comprises means for causing, at least in part, a binning of the one or more bin values into one or more respective bins based, at least in part, on the one or more continuous bin values. The apparatus further comprises means for processing and/or facilitating a processing of the one or more bin values in the respective one or more bins to determine statistical information for the respective one or more bins. The apparatus also comprises means for causing, at least in part, a re-transformation of the statistical information, the one or more bin values, or a combination thereof into the one or more data values following the determination of the statistical information.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 4 is a flowchart of a process for determining an integer portion and/or floating value portion of the one or more bin values, according to one embodiment;

DESCRIPTION OF SOME EMBODIMENTS

Examples of a method, apparatus, and computer program for transforming curvature values into bin values for comprehensible description are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1A:
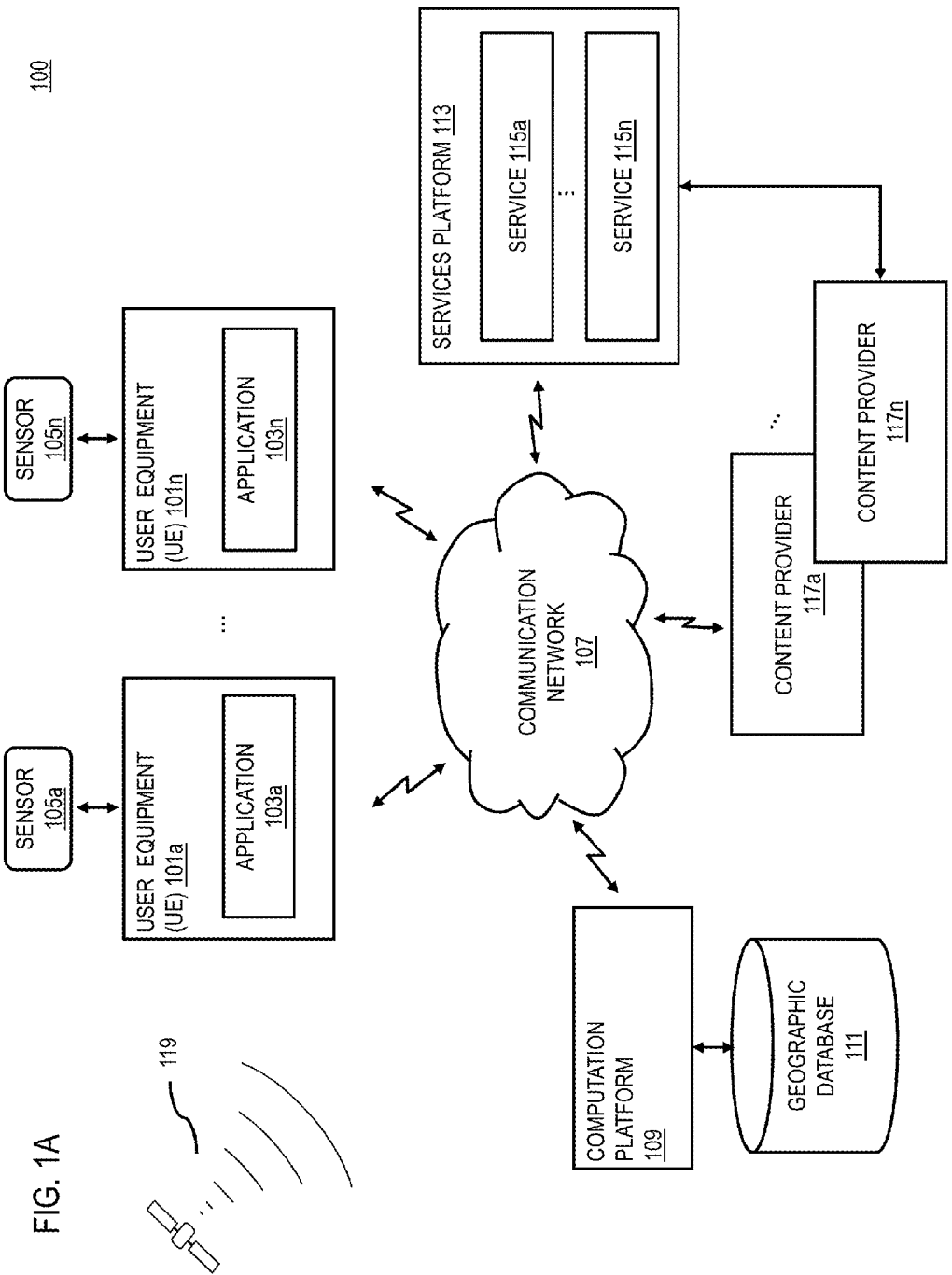
FIG. 1A is a diagram of a system capable of transforming curvature values into bin values for comprehensible description, according to one embodiment.

FIG. 1A is a diagram of a system capable of transforming curvature values into bin values for comprehensible description, according to one embodiment. There is an increasing interest in the development of vehicles (e.g., autonomous vehicles, highly-assisted vehicles (HAD), etc.) that are able to at least partially drive or otherwise operate themselves without input from vehicle users or occupants. One area of development has been with respect to real-time calculation of road features, for example, curvatures. In one scenario, autonomous vehicles comprise of integrated mapping system that implements the real-time calculation of road features during navigation towards a destination. Therefore, accuracy of calculation is important to ensure safe user experience under various road conditions. However, there is difficulty in ensuring accuracy and reliability on the calculation of road features due to the highly non-linear nature of curvature statistics.

To address this problem, a system 100 of FIG. 1A introduces the capability to transform curvature values into bin values for comprehensible description. In one scenario, a curvature is the change in heading per distance traveled (arc length). It is mainly a description of the geometry of the road (e.g., how share is the turn). The information on map curvature is useful for automotive clients for features, such as, notification when a vehicle needs to slow down for a sharp curve, aiming headlights (e.g., adaptive headlights that gives a better view of the road around the curves and bends), traction control (e.g., optimizing grip and stability of a vehicle on the road during acceleration by measuring wheel rotation) etc. However, curvatures for a path or a spline involve several derivatives, henceforth leaving it very sensitive to small shape changes. In one example embodiment, system 100 may compute standard deviation of error between a set of thousands of radius of curvature values. The errors on the straight roads may be significant compared to the errors on the curves, and may obscure the rest of the results. The system 100 may highlight the errors on the curvature irrelevant to how miniscule the errors are. In one example embodiment, the influence of a curvature is non-linear, for instance, a 5 meter radius of curvature error for a tight turn is significant, whilst a 1000 meter error along a straight road segment (infinite radius of curvature) is negligible. For example, a straight road segment has a radius of curvature toward infinity (i.e., a defined center of curvature may not exist). In this case, there is little real difference between a 10000 meter radius of curvature compared to a radius of curvature of 100000000 meter, even though difference is 99990000 meters. As a result, system 100 provides for a method of computing accuracy, standard deviations and other statistical value which are not skewed by the non-linearity of curvature values.

In one scenario, the sensitivity of curvature and its non-linear characteristic makes it difficult to clearly state the similarity between two curvature values or the accuracy to a ground truth value. The curvature values are difficult to conceptualize (i.e., typical curvature values for a road may range from 0.2 to 0.00001, where 0.00001 is considered straight). Typically, the curvature values are discussed using the reciprocal (i.e., the radius of curvature). However, the radius of curvature value includes infinity (e.g., from 5 m to infinity (straight)). This makes the values difficult to work with in a statistical manner. As a result, the system 100 provides a more stable temporary space for performing curvature computation using continuous bins. The result from computation is then returned back into the original curvature description. In one example embodiment, there may be thousands of curvature samples for a single road section. The system 100 may convert the curvature values into continuous bins, and then take the average in this binned space. This creates a more stable average that is not skewed by the non-linearity of curvature values (e.g., the large values near infinity for straight roads).

As shown in FIG. 1A, the system 100 comprises user equipment (UE) 101a-101n (collectively referred to as UE 101) that may include or be associated with applications 103a-103n (collectively referred to as applications 103) and sensors 105a-105n (collectively referred to as sensors 105). In one embodiment, the UE 101 has connectivity to a computation platform 109 via the communication network 107. In one embodiment, the computation platform 109 performs one or more functions associated with transforming curvature values into bin values for comprehensible description.

By way of example, the UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, fitness device, television receiver, radio broadcast receiver, electronic book device, game device, devices associated with one or more vehicles or any combination thereof, including the accessories and peripherals of these devices, or any combination thereof. It is also contemplated that the UE 101 can support any type of interface to the user (such as "wearable" circuitry, etc.). In one embodiment, the one or more vehicles may have cellular or Wi-Fi connection either through the inbuilt communication equipment or from the UE 101 associated with the vehicles. The applications 103 may assist in conveying sensor information via the communication network 107.

By way of example, the applications 103 may be any type of application that is executable at the UE 101, such as mapping application, location-based service applications, navigation applications, content provisioning services, camera/imaging application, media player applications, social networking applications, calendar applications, and the like. In one embodiment, one of the applications 103 at the UE 101 may act as a client for the computation platform 109 and perform one or more functions associated with the functions of the computation platform 109 by interacting with the computation platform 109 over the communication network 107.

By way of example, the sensors 105 may be any type of sensor. In certain embodiments, the sensors 105 may include, for example, a global positioning sensor for gathering location data, a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data, an audio recorder for gathering audio data, velocity sensors, and the like. In another embodiment, the sensors 105 may include light sensors, oriental sensors augmented with height sensor and acceleration sensor (e.g., an accelerometer can measure acceleration and can be used to determine orientation of the UE 101), tilt sensors to detect the degree of incline or decline of the vehicle along a path of travel, moisture sensors, pressure sensors, etc. In a further example embodiment, sensors about the perimeter of the vehicle may detect the relative distance of the vehicle from lanes or roadways, the presence of other vehicles, pedestrians, traffic lights, road features (e.g., curves) and any other objects, or a combination thereof. In one scenario, the sensors 105 may detect weather data, traffic information, or a combination thereof. In one example embodiment, the UE 101 may include GPS receivers to obtain geographic coordinates from satellites 119 for determining current location and time associated with the UE 101. Further, the location can be determined by a triangulation system such as A-GPS, Cell of Origin, or other location extrapolation technologies. In another example embodiment, the one or more sensors may provide in-vehicle navigation services, wherein one or more location based services may be provided to the at least one vehicle and/or at least one UE 101 associated with the at least one vehicle.

The communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In one embodiment, the computation platform 109 may be a platform with multiple interconnected components. The computation platform 109 may include multiple servers, intelligent networking devices, computing devices, components and corresponding software for transforming curvature values into bin values for comprehensible description. In addition, it is noted that the computation platform 109 may be a separate entity of the system 100, a part of the one or more services 115a-115n (collectively referred to as services 115) of the services platform 113, or included within the UE 101 (e.g., as part of the applications 103).

Presently, the discrete bins solution provides for skewed computation using curvature values due to non-linear distribution of curvature values. The present solution also experiences difficulty in communicating curvature values in a comprehensible manner to the users. Further, there have been issues in describing a single accuracy value that is meaningful because accuracy varies across the range, for example, a 3 m error on small radii is more significant than a 1000 m error when radius is near infinity. As a result, the computation platform 109 may cause, at least in part, an application of at least one transformation function to one or more data values to transform the one or more data values into one or more bin values. In one scenario, the computation platform 109 provides a continuous bin transform for accuracy in curvature values and for better communication of the accurate values to one or more users. The computation platform 109 may handle non-linearity of curvature in computational values for improved computation of aggregated data.

In one embodiment, the computation platform 109 may cause, at least in part, a binning of the one or more bin values into one or more respective bins based, at least in part, on the one or more bin values. In one scenario, the one or more bins provide a more stable temporary space for performing curvature computation using continuous bin values.

In one embodiment, the computation platform 109 may process and/or facilitate a processing of the one or more bin values in the respective one or more bins to determine statistical information for the respective one or more bins. In one scenario, the numerous curvature values for a single road section are converted to continuous bins. Then, the computation platform 109 may take the average in this binned space. This creates a more stable average that is not skewed by the non-linearity of values (and large values near infinity for straight roads).

Subsequently, the computation platform 109 may cause, at least in part, a re-transformation of the statistical information, the one or more bin values, or a combination thereof into the one or more data values following the determination of the statistical information. In one scenario, the results calculated in one or more stable temporary space is then returned back into the original curvature values. This provides for a comparative curvature model for computational accuracy and statistical comparison. In one scenario, the computation platform 109 may provide a single accuracy value that is meaningful across the range of curvature values. This evens out non-linear curvature characteristics and prevents extreme radius values from skewing statistics not skewed by sign changes.

In one embodiment, the geographic database 111 may store attributes (e.g., curvature information, radius information, etc.) for one or more travel segments. The information may be any multiple types of information that can provide means for aiding in the content provisioning and sharing process.

The services platform 113 may include any type of service. By way of example, the services platform 113 may include mapping services, navigation services, travel planning services, notification services, social networking services, content (e.g., audio, video, images, etc.) provisioning services, application services, storage services, contextual information determination services, location based services, information (e.g., weather, news, etc.) based services, etc. In one embodiment, the services platform 113 may interact with the UE 101, the computation platform 109 and the content provider 117 to supplement or aid in the processing of the content information.

By way of example, the services 115 may be an online service that reflects interests and/or activities of users. The services 115 allow users to share location information (e.g., speed information), activities information (e.g., travel plans), contextual information, historical user information and interests within their individual networks, and provides for data portability. The services 115 may additionally assist in providing the computation platform 109 with information on travel plans of at least one user, activity information for at least one user in at least one location, speed information for at least one user, user profile information, and a variety of additional information.

The content providers 117a-117n (collectively referred to as content provider 117) may provide content to the UE 101, the computation platform 109, and the services 115 of the services platform 113. The content provided may be any type of content, such as, image content (e.g., maps), textual content, audio content, video content, etc. In one embodiment, the content provider 117 may provide content that may supplement content of the applications 103, the sensors 105, or a combination thereof. By way of example, the content provider 117 may provide content that may aid in transforming curvature values into bin values. In one embodiment, the content provider 117 may also store content associated with the UE 101, the computation platform 109, and the services 115 of the services platform 113. In another embodiment, the content provider 117 may manage access to a central repository of data, and offer a consistent, standard interface to data, such as, a repository of attributes for one or more slopes, one or more curvature, or a combination thereof. Any known or still developing methods, techniques or processes for transforming curvature values into bin values may be employed by the computation platform 109.

By way of example, the UE 101, the computation platform 109, the services platform 113, and the content provider 117 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 1B:
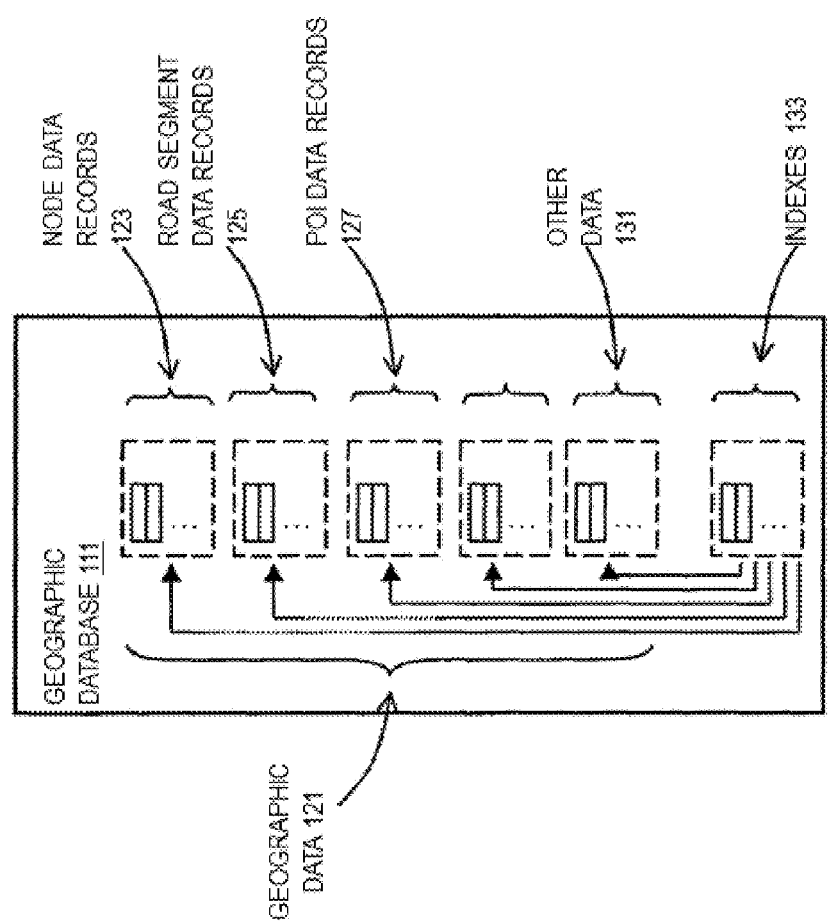
FIG. 1B is a diagram of the geographic database 111 of system 100, according to exemplary embodiments.

FIG. 1B is a diagram of the geographic database 111 of system 100, according to exemplary embodiments. In the exemplary embodiments, POIs and map generated POIs data can be stored, associated with, and/or linked to the geographic database 111 or data thereof. In one embodiment, the geographic or map database 111 includes geographic data 121 used for (or configured to be compiled to be used for) mapping and/or navigation-related services, such as for personalized route determination, according to exemplary embodiments. For example, the geographic database 111 includes node data records 123, road segment or link data records 125, POI data records 127, and other data records 131, for example. More, fewer or different data records can be provided. In one embodiment, the other data records 131 include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example.

In exemplary embodiments, the road segment data records 125 are links or segments representing roads, streets, parking areas, or paths, as can be used in the calculated route or recorded route information for determination of one or more personalized routes, according to exemplary embodiments. The node data records 123 are end points corresponding to the respective links or segments of the road segment data records 125. The road link data records 125 and the node data records 123 represent a road network, such as used by vehicles, cars, and/or other entities. Alternatively, the geographic database 111 can contain path segment and node data records or other data that represent pedestrian paths or areas in addition to or instead of the vehicle road record data, for example.

The road link and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, parking areas (attributes on which parking areas are critical) etc. The geographic database 111 can include data about the POIs and their respective locations in the POI data records 127. The geographic database 111 can also include data about places, such as cities, towns, or other communities, and other geographic features, such as bodies of water, mountain ranges, etc. Such place or feature data can be part of the POI data 127 or can be associated with POIs or POI data records 127 (such as a data point used for displaying or representing a position of a city).

The geographic database 111 can be maintained by the content provider in association with the services platform 113 (e.g., a map developer). The map developer can collect geographic data to generate and enhance the geographic database 111. There can be different ways used by the map developer to collect data. These ways can include obtaining data from other sources, such as municipalities or respective geographic authorities (e.g., designated parking areas). In addition, the map developer can employ field personnel to travel by vehicle along roads throughout the geographic region to observe features and/or record information about them, for example. Also, remote sensing, such as aerial or satellite photography, can be used.

The geographic database 111 can be a master geographic database stored in a format that facilitates updating, maintenance, and development. For example, the master geographic database 111 or data in the master geographic database 111 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a UE 101, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 111 can be a master geographic database, but in alternate embodiments, the geographic database 111 can represent a compiled navigation database that can be used in or with end user devices (e.g., UEs 101) to provided navigation-related functions. For example, the geographic database 111 can be used with the UE 101 to provide an end user with navigation features. In such a case, the geographic database 111 can be downloaded or stored on the UE 101, such as in the applications 103, or the UE 101 can access the geographic database 111 through a wireless or wired connection (such as via a server and/or the communication network 107), for example.

In one embodiment, the end user device or UE 101 can be an in-vehicle navigation system, a personal navigation device (PND), a portable navigation device, a cellular telephone, a mobile phone, a personal digital assistant (PDA), a watch, a camera, a computer, and/or other device that can perform navigation-related functions, such as digital routing and map display. In one embodiment, the navigation device UE 101 can be a cellular telephone. An end user can use the device UE 101 for navigation functions, for example, slope and curvature map updates.

Figure 2:
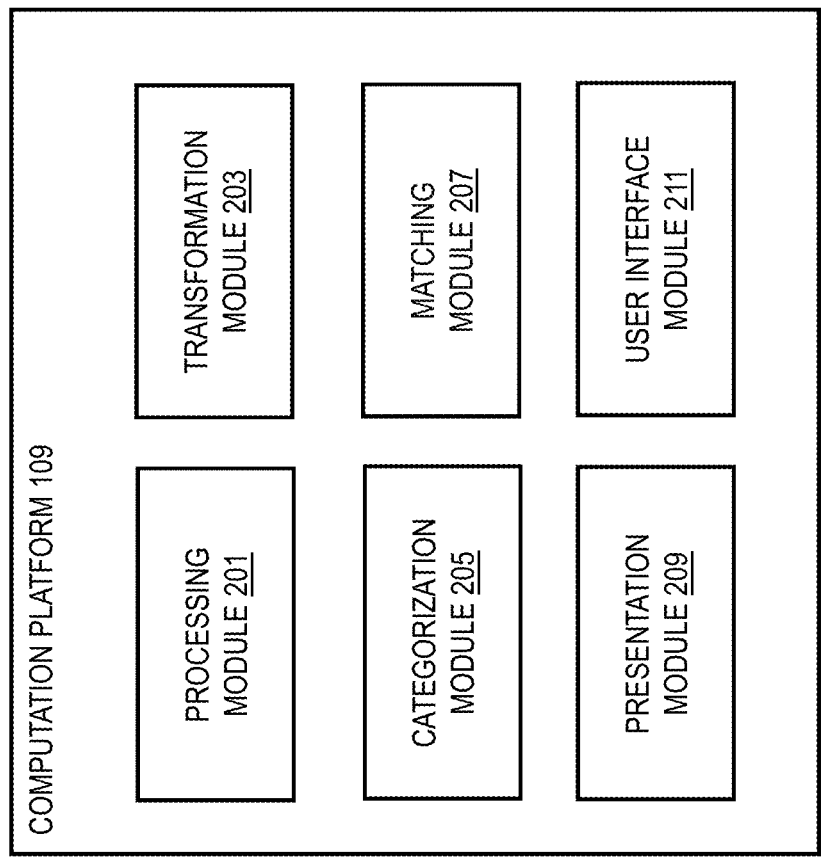
FIG. 2 is a diagram of the components of the computation platform 109, according to one embodiment.

FIG. 2 is a diagram of the components of the computation platform 109, according to one embodiment. By way of example, the computation platform 109 includes one or more components for transforming curvature values into bin values for comprehensible description. It is contemplated that the functions of these components may be combined in one or more components or performed by other components of equivalent functionality. In this embodiment, the computation platform 109 includes a processing module 201, a transformation module 203, a categorization module 205, a matching module 207, a presentation module 209, and a user interface module 211.

In one embodiment, the processing module 201 may process one or more data values for transforming the data values into one or more bin values. In one scenario, the one or more data values include, at least in part, one or more curvature values. The one or more curvature values include, at least in part, radius information, curvature information, road details, acceleration information, or a combination thereof. In one example embodiment, data values may have complex statistics because the values are not very intuitive (e.g., sensitivity of the curvature, non-linear characteristic of the curvature etc.), therefore data values are converted to bin value for simplistic results. In another scenario, the processing module 201 may process one or more bin values in their respective bins to determine their statistical information. In one scenario, the computation of the one or more bin values includes, at least in part, a standard deviation, an average, a crowd sourced aggregation values, or a combination thereof.

In one embodiment, the transformation module 203 may convert one or more data values into one or more bin values. In one scenario, the transformation module 203 may implement a transform function to the one or more data values. The transform function include, at least in part, a conversion of one or more data values into one or more scaled logs, a change in sign values for one or more data values, or a combination thereof. In one scenario, the curvature results are transformed to bin values using the $Log_{10}$ value method from the transform function. In another embodiment, the transform function includes a continuous value whose integer portion represents discrete bins. Therefore, the transformation module 203 may compute full statistics since the values are continuous and communicates the results with the simpler (integer) bin description. In another embodiment, the transformation module 203 may cause a re-transformation of the statistical information, one or more bin values, or a combination thereof into one or more data values.

In one embodiment, the categorization module 205 may categorize one or more bin values into one or more respective bins. In one scenario, the most intuitive method for defining curvature accuracy is to place curvature values in bins with ranges that are meaningful so that huge radii values do not skew the statistics. In one example embodiment, a radius of curvature of 1400 m may be transformed to a 5.123. Then, the value 5.123 may be used for statistic computation whilst it can be determined that the value is in bin 5.

In one embodiment, the matching module 207 may cause a matching between one or more bin values, one or more respective bins, or a combination thereof. In one scenario, at least one straight travel segment is mapped as zero. In another embodiment, the matching module 207 may cause a statistical comparison of the one or more continuous bin values to determine confidence level. In one scenario, a selection and/or a recommendation of at least one travel segment is based, at least in part, on the confidence level. In a further embodiment, the matching module 207 may cause an increase in the set of bins based, at least in part, on an increase in the radius of curvature.

In one embodiment, the presentation module 209 obtains a set of summary statistics from other modules, and continues with providing a presentation of the updated slope and curvature maps. In another embodiment, the presentation module 209 may cause a presentation of updated slope and curvature maps based, at least in part, on data density information, network information, or a combination thereof. In a further embodiment, the presentation module 209 may cause a presentation of updated slope and curvature maps based on time-based information, routing information, preference information, or a combination thereof.

In one embodiment, the user interface module 211 employs various application programming interfaces (APIs) or other function calls corresponding to the applications 103 of the UE 101, thus enabling the display of graphics primitives such as maps, menus, data entry fields, etc., for generating the user interface elements. By way of example, the user interface module 211 generates the interface in response to APIs or other function calls corresponding to the browser application of the UE 101, thus enabling the display of graphics primitives. In another embodiment, the user interface module 211 may cause a presentation of one or more updated slope and curvature maps in at least one user interface element of a user interface, wherein the representation of the updated slope and curvature maps include, at least in part, a panning, a highlighting, a raising, a thickening, or a combination thereof.

Figure 3:
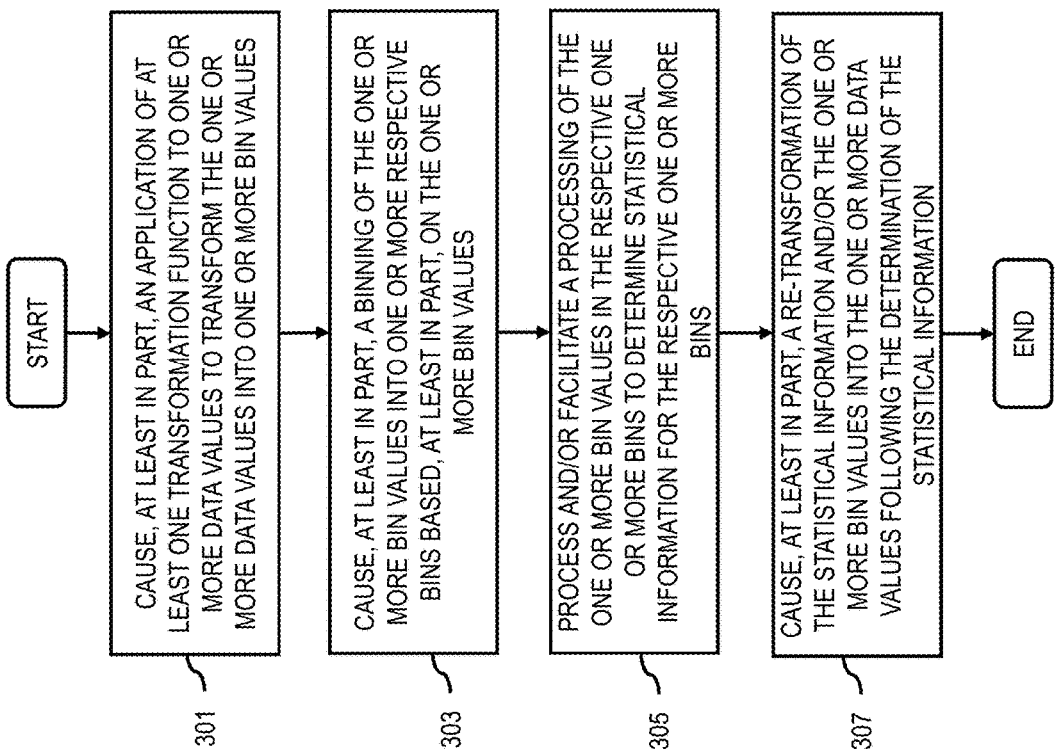
FIG. 3 is a flowchart of a process for transforming data values to bin values for placement into respective bins to determine their statistical information, and re-transforming the statistical information into data values, according to one embodiment.
Figure 11:
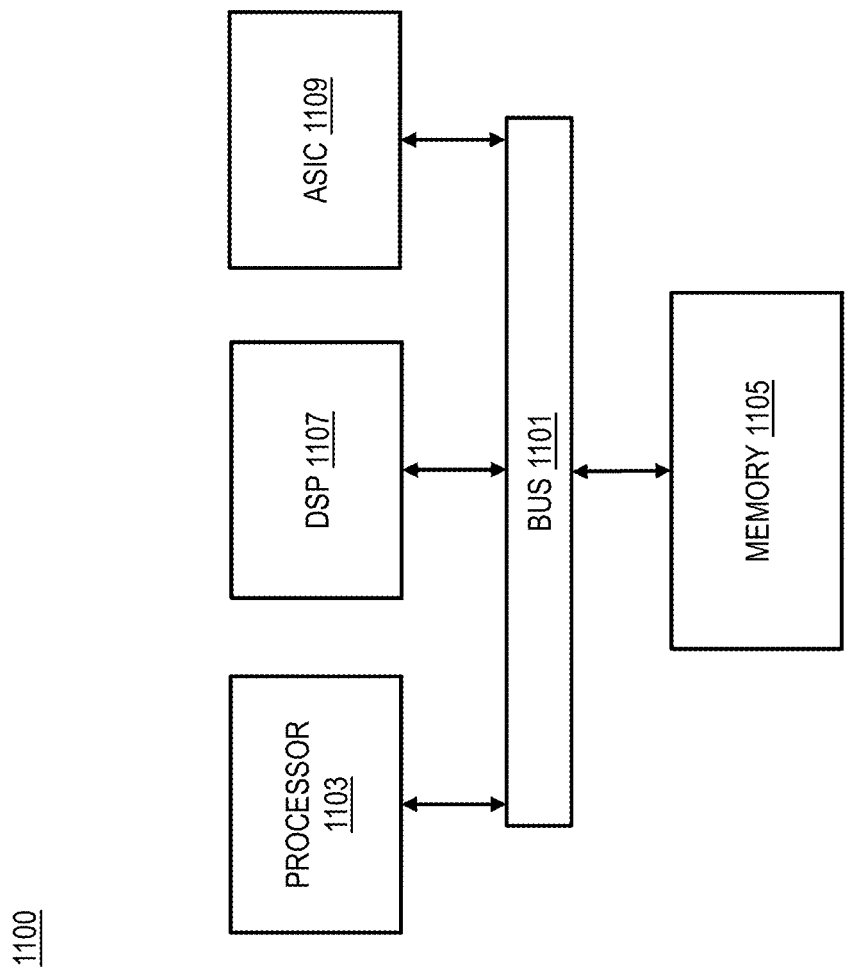
FIG. 11 is a diagram of a chip set that can be used to implement an embodiment of the invention.

The above presented modules and components of the computation platform 109 can be implemented in hardware, firmware, software, or a combination thereof. Though depicted as a separate entity in FIG. 1A, it is contemplated that the computation platform 109 may be implemented for direct operation by respective UE 101s. As such, the computation platform 109 may generate direct signal inputs by way of the operating system of the UE 101 for interacting with the applications 103. In another embodiment, one or more of the modules 201-211 may be implemented for operation by respective UE 101s, as a computation platform 109, or combination thereof. Still further, the computation platform 109 may be integrated for direct operation with the services 115, such as in the form of a widget or applet, in accordance with an information and/or subscriber sharing arrangement. The various executions presented herein contemplate any and all arrangements and models FIG. 3 is a flowchart of a process for transforming data values to bin values for placement into respective bins to determine their statistical information, and re-transforming the statistical information into data values, according to one embodiment. In one embodiment, the computation platform 109 performs the process 300 and is implemented in, for instance, a chip set including a processor and a memory as shown in FIG. 11.

In step 301, the computation platform 109 may cause, at least in part, an application of at least one transformation function to one or more data values to transform the one or more data values into one or more bin values. In one embodiment, the one or more data values include, at least in part, one or more curvature values. In another embodiment, the one or more bin values include, at least in part, one or more continuous bin values. As discussed, with an increase in autonomous vehicles and the dependence on accurate maps, a statement of accuracy is likely to become more important and necessary. Since defining curvature statistics is difficult because the values are not very intuitive, the computation platform 109 may transform curvature values into continuous bin values to perform computation on these continuous bin values.

In step 303, the computation platform 109 may cause, at least in part, a binning of the one or more bin values into one or more respective bins based, at least in part, on the one or more bin values. In one scenario, accurate computation of curvature values suffered from the effects of non-linearity of curvatures, especially for straight road sections. Hence, allotting the transformed bin values into respective bins gives the computation platform 109 the opportunity to process the bin values in an organized manner in a stable temporary space.

In step 305, the computation platform 109 may process and/or facilitate a processing of the one or more bin values in the respective one or more bins to determine statistical information for the respective one or more bins. In one embodiment, the statistical information includes, at least in part, an accuracy of the one or more curvature values. In one scenario, the computation platform 109 may compute curvature accuracy based on the continuous log scale. In another scenario, the resulting accuracy may also indicate the number of bins that are in error, for example, standard deviation (StdDev) of 1.5 may mean that the value is within 1.5 buckets 68% of the time.

In step 307, the computation platform 109 may cause, at least in part, a re-transformation of the statistical information, the one or more bin values, or a combination thereof into the one or more data values following the determination of the statistical information. In one example embodiment, the computation platform 109 may apply a transform function (e.g., equations) to one or more curvature values (e.g., 0.2 to 0.00001) to one or more bin values (e.g., 1.12, 5.12, 5.43). Next, the computation platform 109 may categorize the bin values into one or more mapped bins. Then, the computation platform 109 may determine statistic information (e.g., accuracy) for the one or more bins. The process of determining statistic information may involve calculating average and/or StdDev and/or crowd sourced aggregation for the one or more bin values. Subsequently, the computation platform 109 may convert the statistic information and the bin values back to the curvature values.

FIG. 4 is a flowchart of a process for determining an integer portion and/or floating value portion of the one or more bin values, according to one embodiment. In one embodiment, the computation platform 109 performs the process 400 and is implemented in, for instance, a chip set including a processor and a memory as shown in FIG. 11.

In step 401, the computation platform 109 may determine an integer portion of the one or more bin values. In one embodiment, the binning of the one or more bin values into the one or more respective bins is based, at least in part, on the integer portion. In one scenario, the integer portion of one or more bins values represents discrete bins and/or curvature range values.

In step 403, the computation platform 109 may determine a floating value portion of the one or more bin values. In one example embodiment, a radius of curvature of 1400 m may be transformed to bin value of 5.123. Then, the computation platform 109 may use the 5.123 value for statistics computation, and the 5.123 value may represent bin 5.

In step 405, the computation platform 109 may process and/or facilitate a processing of the floating value portion to determine the statistical information. In one scenario, the computation platform 109 may compute full statistical information since the values are continuous, and may communicate the results with the simpler (integer) bin description.

Figure 5:
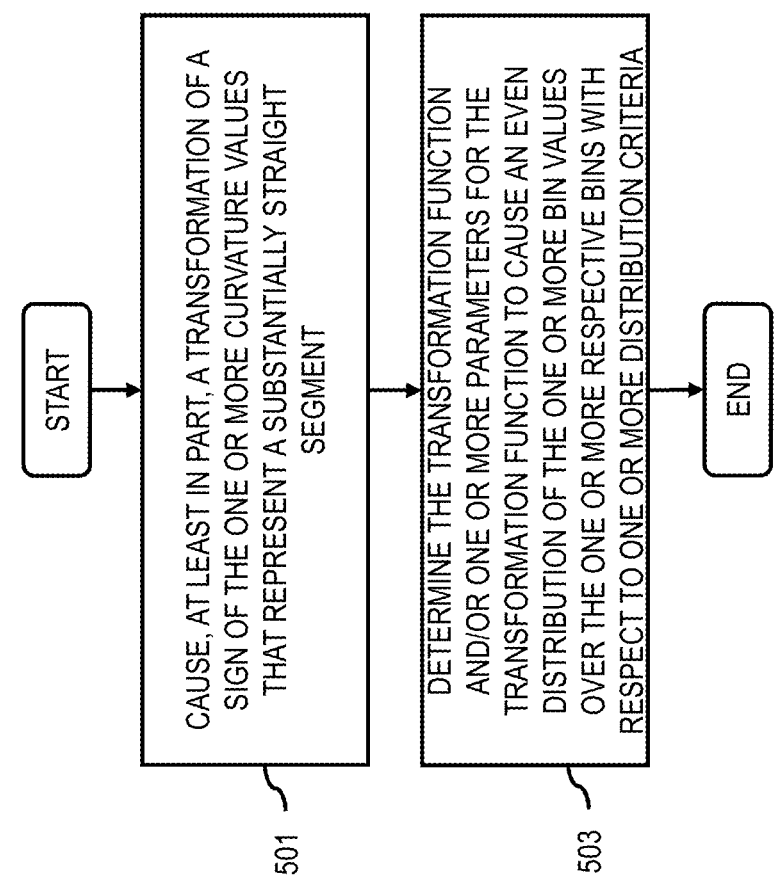
FIG. 5 is a flowchart of a process for causing a transformation of a sign for curvature values, and determining transformation function and/or parameters for a transformation function for even distribution of bin values, or a combination thereof, according to one embodiment.

FIG. 5 is a flowchart of a process for causing a transformation of a sign for curvature values, and determining transformation function and/or parameters for a transformation function for even distribution of bin values, or a combination thereof, according to one embodiment. In one embodiment, the computation platform 109 performs the process 500 and is implemented in, for instance, a chip set including a processor and a memory as shown in FIG. 11.

In step 501, the computation platform 109 may cause, at least in part, a transformation of a sign of the one or more curvature values that represent a substantially straight segment. In one embodiment, the binning of the one or more bin values associated with the substantially straight segment is based, at least in part, on the transformation of the sign. In one scenario, the computation platform 109 may evenly distribute the radius of curvature values and provides a continuous function by converting the curvature values to scaled logs. In one example embodiment, one or more curvature values may be divided into approximately 20 bins (signed). Further, the computation platform 109 may change the sign values (−infinite to +infinite) for curvature values to prevent the transition from distorting the statistical information. The computation platform 109 may map one or more straight road segments to bin zero because the curvature of radius alternates between positive and negative infinity in a straight road.

In step 503, the computation platform 109 may determine the at least one transformation function, one or more parameters for the at least one transformation function, or a combination thereof to cause, at least in part, an even distribution of the one or more bin values over the one or more respective bins with respect to one or more distribution criteria.

Figure 6:
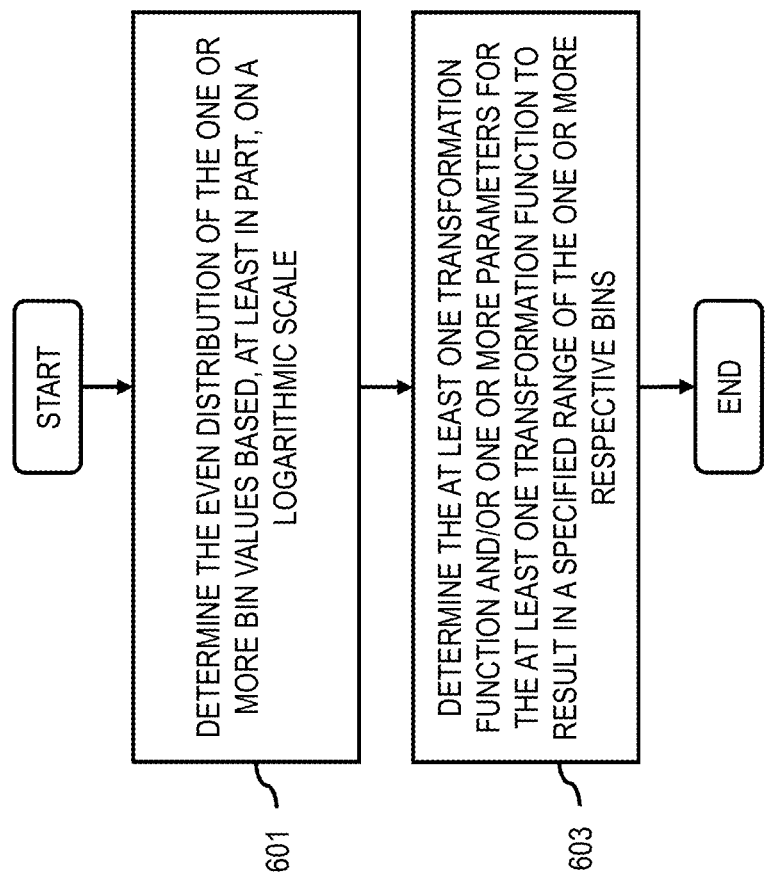
FIG. 6 is a flowchart of a process for determining even distribution for bin values, and transformation function and/or parameters for transformation function for respective bins, according to one embodiment.

FIG. 6 is a flowchart of a process for determining even distribution for bin values, and transformation function and/or parameters for transformation function for respective bins, according to one embodiment. In one embodiment, the computation platform 109 performs the process 600 and is implemented in, for instance, a chip set including a processor and a memory as shown in FIG. 11.

In step 601, the computation platform 109 may determine the even distribution of the one or more bin values based, at least in part, on a logarithmic scale. In one scenario, the computation platform 109 may convert curvature values to a scaled Log base description. The radius of curvature values is evenly distributed. The scale and offset are chosen so that bin values have some specific range of bins.

In step 603, the computation platform 109 may determine the at least one transformation function, one or more parameters for the at least one transformation function, or a combination thereof to result in a specified range of the one or more respective bins. In one embodiment, the one or more parameters include, at least in part, a scale parameter, an offset parameter, or a combination thereof.

Figure 7A:
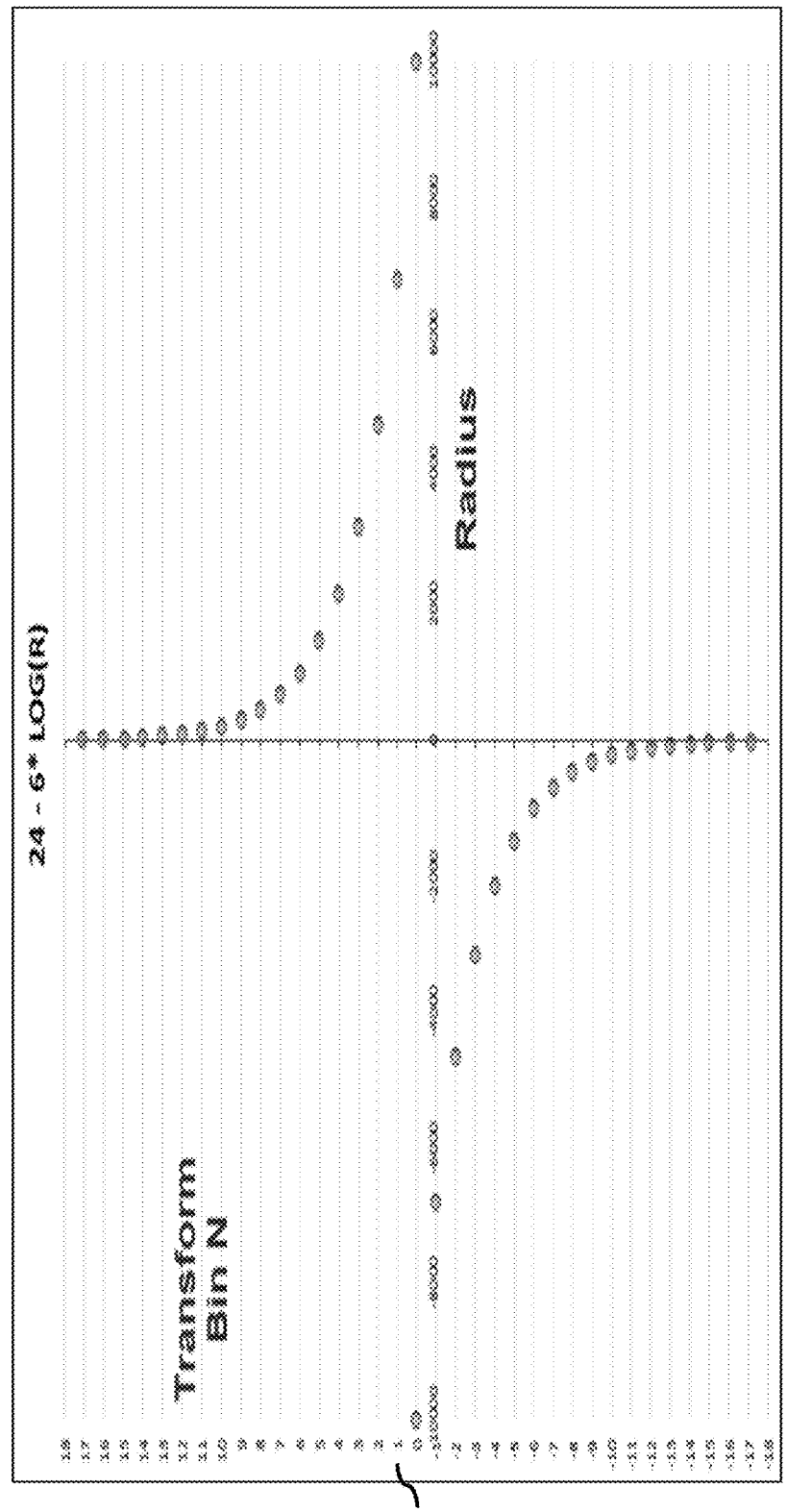
FIGS. 7 A-D are graph diagrams that represent the radius/curvature transform method, according to various example embodiments.
Figure 7B:
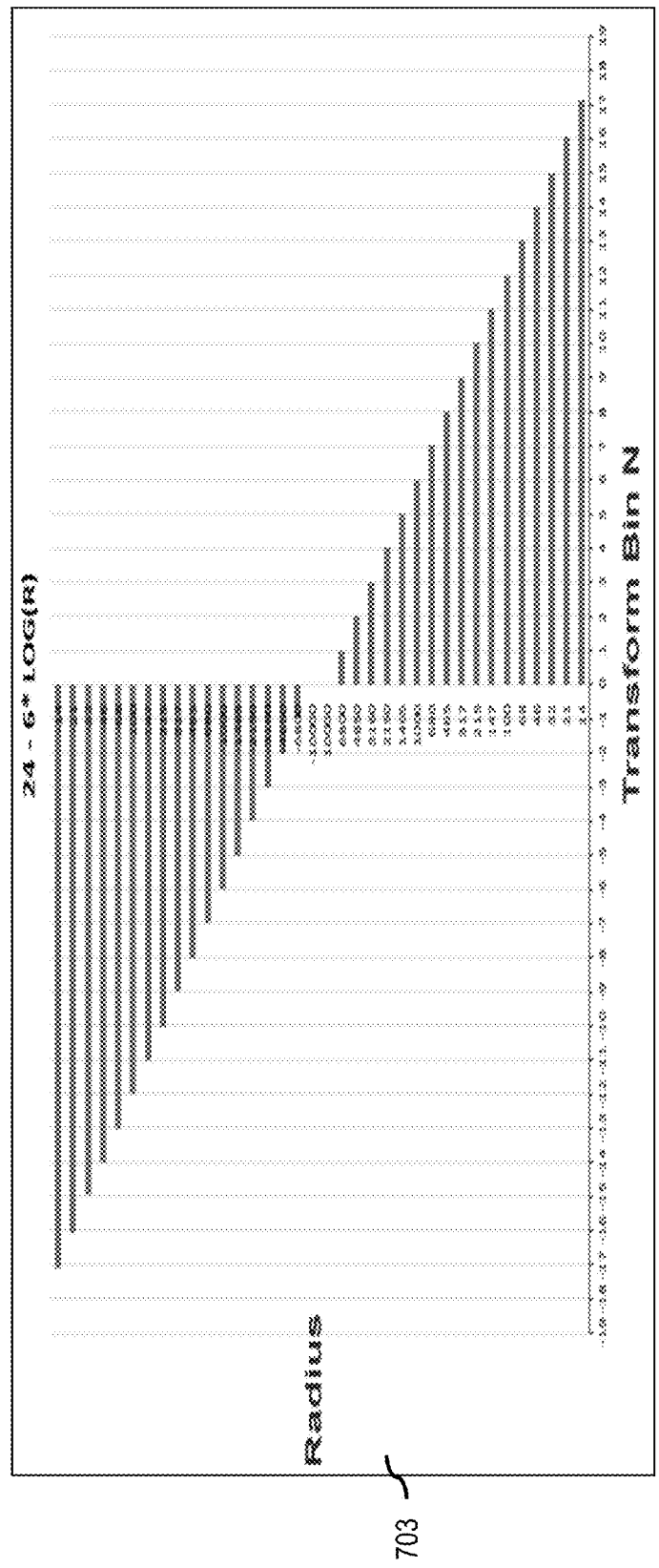

FIGS. 7 A-D are graph diagrams that represent the radius/curvature transform method, according to various example embodiments. In one scenario, FIG. 7A represents a scenario wherein the curvature transform is defined as N=24−6*Log$^{10}$ (Radius). However, the sensitivity of curvature and its non-linear characteristic make it difficult to clearly state the similarity between two curvature values or accuracy to a ground truth value [701]. As a result, the most intuitive method for defining curvature accuracy is to place values in bins with ranges that are meaningful so that huge radii values do not skew the statistics. In one scenario, FIG. 7B is a graphical representation of log mapped curvature bins wherein the one or more curvature values are transformed into one or more bin values for the purpose of categorization. In one scenario, radius (R) is converted into continuous bin (N) [703]:

$$N=[24-6\ \text{Log}^{10}(\text{Abs}(R)]*\text{Sign}(R),$$

Where R<10000

Typical: 14<R<10000

In one scenario, FIG. 7C is a graphical representation of mapping one or more bins to the radius of curvature. Although the equation $N=24-6*Log^{10}$ (Radius) is continuous, it might be useful to consider the N value as creating 36 bins of curvature [705], each with an increasing range of radii values as the radius increases [707]. Therefore, an error values of X would mean users are within X bins of the actual value (the error value are equally weighted). In one scenario, FIG. 7D represents a scenario wherein radius of curvature is mapped to bins. In one scenario, bin (N) is converted back to Radius (R):

$$R=10^{\wedge}[(24-Abs(N))/6]*sign(N)$$

Typical: −18<N<18

The result of such conversion is a set of continuous bins which increase with the radius of the curvature. In one scenario, the statistical computations are applied on the continuous bin values, e.g., StdDevErr=1.35 bins.

Figure 9:
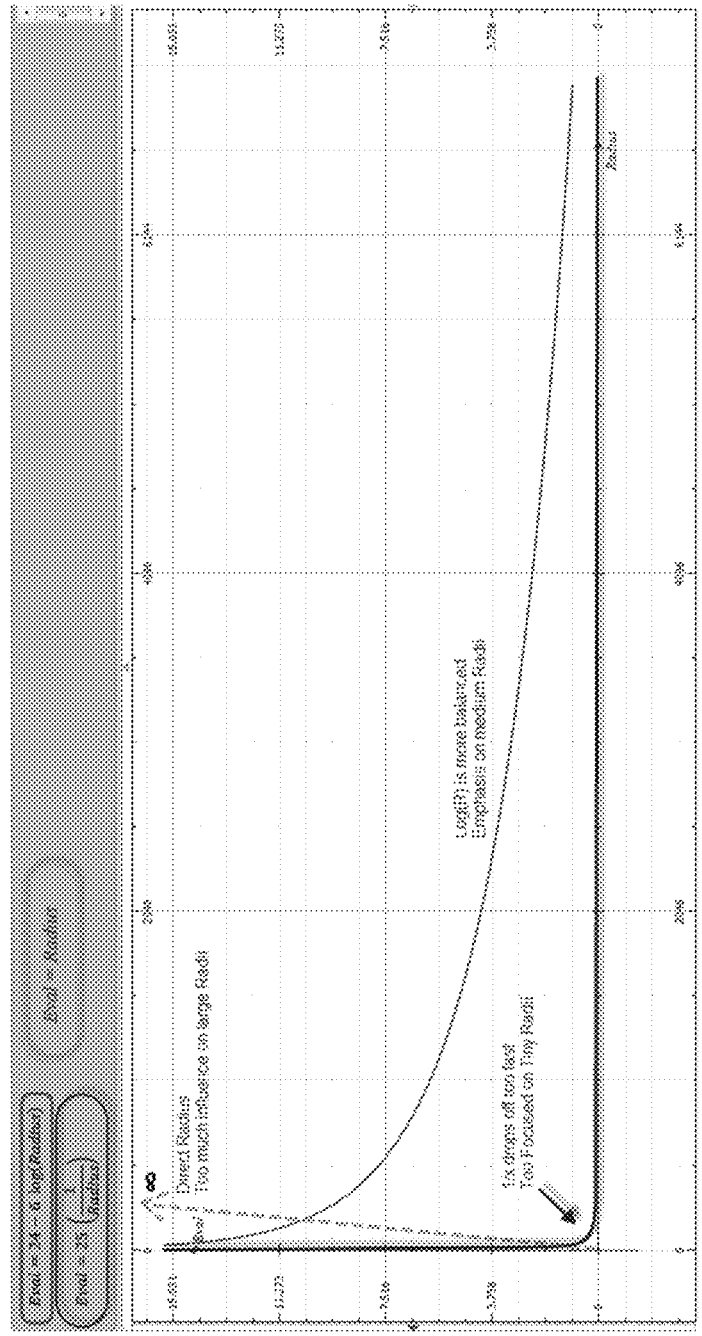
FIG. 9 is a graph diagram that represents curvature compared to logarithmic model, according to one example embodiment.

In another scenario, the transformed continuous bin values may provide a means for more efficient storage and data distribution. The bin values provide a more normalized numerical resolution. Therefore, a higher compression may be achieved without loss of significant information. A client might receive the floating point bin value across the network. When the original, non-linear curvature representation is desired, the inverse transform is applied by a client. In one embodiment, the transformed bin values are used for storage and distribution, therefore providing a more efficient numerical resolution and enabling higher compression. In one scenario, instead of just using the (floating point) bins for statistical computation, they may also provide a better means for storage (e.g., on disk, database, or in the cloud) and distribution (across the network), since the bins allow less significant digits to represent the curvature values with minimal loss of useful information. Further, an inverse transform is applied by a client when the original state is desired. In another scenario, when the curvature values are stored as (floating) bin values (i.e., the log transformed values), the meaningful statistical error is more evenly distributed across all bins (e.g., −18.0 to 18.0 as shown in FIG. 9). This means that the data values have about the same resolution throughout the entire range (e.g., each range has about the same number of significant digits). This provides a mechanism for allowing better data compression. Therefore, it might be optimal to permanently store the values as these floating point bin values, and after delivery to a client as bin values, the client may then convert the values back to the original non-linear curvature values.

Figure 8:
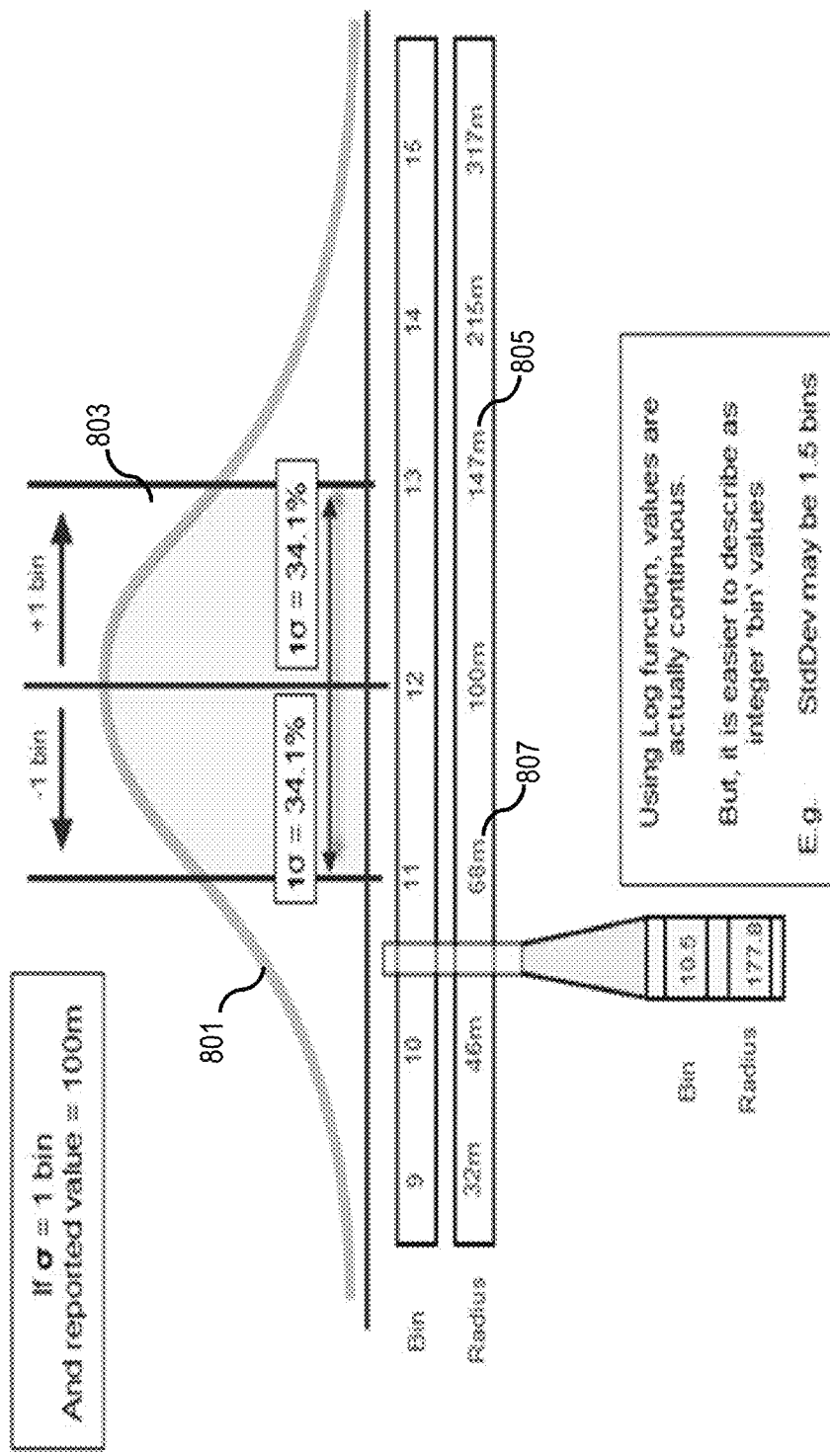
FIG. 8 is a graphical representation of a scenario wherein bins are continuous values suitable for full statistical comparison, according to one example embodiment.

FIG. 8 is a graphical representation of a scenario wherein bins are continuous values suitable for full statistical comparison, according to one example embodiment. In one example embodiment, there may be a curve 801 with a radius of 100 m ground truth. The bucket value is then calculated as follows:

$$N=24-6*log^{10}(radius)=12$$

In one scenario, an accuracy of 68% or 1 sigma may denote that users are within 1 bin. Hence, in this example the user is between bin 11 and bin 13 [803]. In one scenario, bin 11 represents a radius of 147 m [805], whilst bin 13 represents a radius of 68 m [807]. Therefore, with a confidence level of 68% the user is determined to be between radius 68 m and 147 m. On the other hand, assuming that the standard deviation is 1 bin and the reported value is bin 12, a confidence level of 95% may be obtained to denote that a user is between 46 m and 215 m.

FIG. 9 is a graph diagram that represents curvature compared to logarithmic model, according to one example embodiment. In one scenario, the usage of curvature and curvature of radius values is non-linear. The computation platform 109 may stress on the accuracy of ranges of curvature rather than the exact values, for example, when the road is straight, the curvature of radius may alternate between positive and negative infinity. Therefore, these values along straight sections of road may skew any attempt at obtaining a meaningful accuracy. This is especially important when trying to evaluate the accuracy statistics over multiple datasets. In one scenario, the curvature values may be used rather than radius (reciprocal of Radius). However, this value is also skewed toward very small radii.

In one scenario, the computation platform 109 may emphasize on bins of curvature ranges. In one example embodiment, the computation platform 109 may simply convert the curvature to a signed bin number where the bin ranges might consist of:

R=[10000, 5000, 2500, 1000, 750, 500, 300, 200, 150, 125, 100, 75, 50, 25, 10]

The computation platform 109 may group nearby linear roads (>10000) into a single bucket and so on. This provides a buffer against a single range from dominating the statistics. Essentially this is a logarithmic scale. In order to maintain full precision, the computation platform 109 may implement a truncated logarithmic transform. The truncation is to eliminate values out of the range of interest: Clamp Radius values between 14 m and 10000 m. For all internal processing and statistics, the computation platform 109 operates on the log mapped values rather than curvature directly. When the computation platform 109 finally publishes the values, they are converted from Log back into standard curvature.

The model defines a signed value with 18 values for each direction (signed). This can be thought of as having 36 bins to arrange the curvature values. A standard deviation value of 1.5 would mean having accuracy within 1.5 bins at 70% confidence.

Log Mapped Curvature, N:

Bound Input: 14<=Radius<=10000

$$L=6*Log_{10}(Radius) \text{ [Range6}<L<24]$$

Reverse so that the N=0 at the signed value transition when R transitions from +infinity to −infinity:

$$N=24-L$$

Therefore a value ranges of:

Radii=[−100, −30000, 20000, 5000, 100, 10]

Would map to:

N=[−12, 0, 0, 1.81, 12, 17.12]

The processes described herein for transforming curvature values into bin values for comprehensible description may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 10:
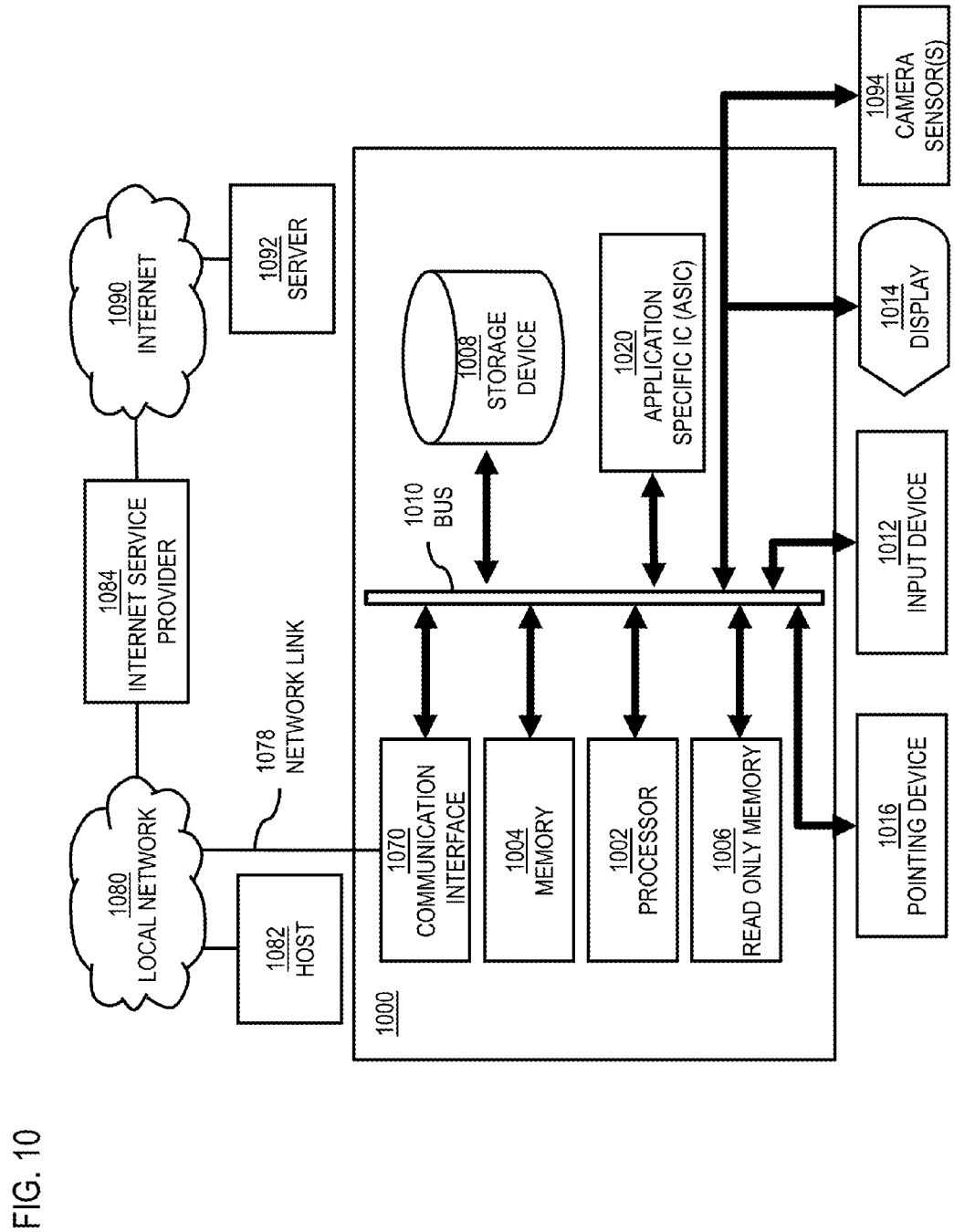
FIG. 10 is a diagram of hardware that can be used to implement an embodiment of the invention.

FIG. 10 illustrates a computer system 1000 upon which an embodiment of the invention may be implemented. Although computer system 1000 is depicted with respect to a particular device or equipment, it is contemplated that other devices or equipment (e.g., network elements, servers, etc.) within FIG. 10 can deploy the illustrated hardware and components of system 1000. Computer system 1000 is programmed (e.g., via computer program code or instructions) to transform curvature values into bin values for comprehensible description as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1000, or a portion thereof, constitutes a means for performing one or more steps of transforming curvature values into bin values for comprehensible description.

A bus 1010 includes one or more parallel conductors of information so that information is transferred quickly among devices coupled to the bus 1010. One or more processors 1002 for processing information are coupled with the bus 1010.

A processor (or multiple processors) 1002 performs a set of operations on information as specified by computer program code related to transform curvature values into bin values for comprehensible description. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 1000 also includes a memory 1004 coupled to bus 1010. The memory 1004, such as a random access memory (RAM) or any other dynamic storage device, stores information including processor instructions for transforming curvature values into bin values for comprehensible description. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or any other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for transforming curvature values into bin values for comprehensible description, is provided to the bus 1010 for use by the processor from an external input device 1012, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT), a liquid crystal display (LCD), a light emitting diode (LED) display, an organic LED (OLED) display, a plasma screen, or a printer for presenting text or images, and a pointing device 1016, such as a mouse, a trackball, cursor direction keys, or a motion sensor, for controlling a position of a small cursor image presented on the display 1014 and issuing commands associated with graphical elements presented on the display 1014, and one or more camera sensors 1094 for capturing, recording and causing to store one or more still and/or moving images (e.g., videos, movies, etc.) which also may comprise audio recordings. In some embodiments, for example, in embodiments in which the computer system 1000 performs all functions automatically without human input, one or more of external input device 1012, display device 1014 and pointing device 1016 may be omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of ASICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer.

In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 107 for transforming curvature values into bin values for comprehensible description to the UE 101.

The term "computer-readable medium" as used herein refers to any medium that participates in providing information to processor 1002, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1008. Volatile media include, for example, dynamic memory 1004. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1020.

Network link 1078 typically provides information communication using transmission media through one or more networks to other devices that use or process the information. For example, network link 1078 may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090.

A computer called a server host 1092 connected to the Internet hosts a process that provides a service in response to information received over the Internet. For example, server host 1092 hosts a process that provides information representing video data for presentation at display 1014. It is contemplated that the components of system 1000 can be deployed in various configurations within other computer systems, e.g., host 1082 and server 1092.

At least some embodiments of the invention are related to the use of computer system 1000 for implementing some or all of the techniques described herein. According to one embodiment of the invention, those techniques are performed by computer system 1000 in response to processor 1002 executing one or more sequences of one or more processor instructions contained in memory 1004. Such instructions, also called computer instructions, software and program code, may be read into memory 1004 from another computer-readable medium such as storage device 1008 or network link 1078. Execution of the sequences of instructions contained in memory 1004 causes processor 1002 to perform one or more of the method steps described herein. In alternative embodiments, hardware, such as ASIC 1020, may be used in place of or in combination with software to implement the invention. Thus, embodiments of the invention are not limited to any specific combination of hardware and software, unless otherwise explicitly stated herein.

The signals transmitted over network link 1078 and other networks through communications interface 1070, carry information to and from computer system 1000. Computer system 1000 can send and receive information, including program code, through the networks 1080, 1090 among others, through network link 1078 and communications interface 1070. In an example using the Internet 1090, a server host 1092 transmits program code for a particular application, requested by a message sent from computer 1000, through Internet 1090, ISP equipment 1084, local network 1080 and communications interface 1070. The received code may be executed by processor 1002 as it is received, or may be stored in memory 1004 or in storage device 1008 or any other non-volatile storage for later execution, or both. In this manner, computer system 1000 may obtain application program code in the form of signals on a carrier wave.

Various forms of computer readable media may be involved in carrying one or more sequence of instructions or data or both to processor 1002 for execution. For example, instructions and data may initially be carried on a magnetic disk of a remote computer such as host 1082. The remote computer loads the instructions and data into its dynamic memory and sends the instructions and data over a telephone line using a modem. A modem local to the computer system 1000 receives the instructions and data on a telephone line and uses an infra-red transmitter to convert the instructions and data to a signal on an infra-red carrier wave serving as the network link 1078. An infrared detector serving as communications interface 1070 receives the instructions and data carried in the infrared signal and places information representing the instructions and data onto bus 1010. Bus 1010 carries the information to memory 1004 from which processor 1002 retrieves and executes the instructions using some of the data sent with the instructions. The instructions and data received in memory 1004 may optionally be stored on storage device 1008, either before or after execution by the processor 1002.

FIG. 11 illustrates a chip set or chip 1100 upon which an embodiment of the invention may be implemented. Chip set 1100 is programmed to transform curvature values into bin values for comprehensible description as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1100 can be implemented in a single chip. It is further contemplated that in certain embodiments the chip set or chip 1100 can be implemented as a single "system on a chip." It is further contemplated that in certain embodiments a separate ASIC would not be used, for example, and that all relevant functions as disclosed herein would be performed by a processor or processors. Chip set or chip 1100, or a portion thereof, constitutes a means for performing one or more steps of providing user interface navigation information associated with the availability of functions. Chip set or chip 1100, or a portion thereof, constitutes a means for performing one or more steps of transforming curvature values into bin values for comprehensible description.

In one embodiment, the chip set or chip 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1100 includes merely one or more processors and some software and/or firmware supporting and/or relating to and/or for the one or more processors.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to transform curvature values into bin values for comprehensible description. The memory 1105 also stores the data associated with or generated by the execution of the inventive steps.

Figure 12:
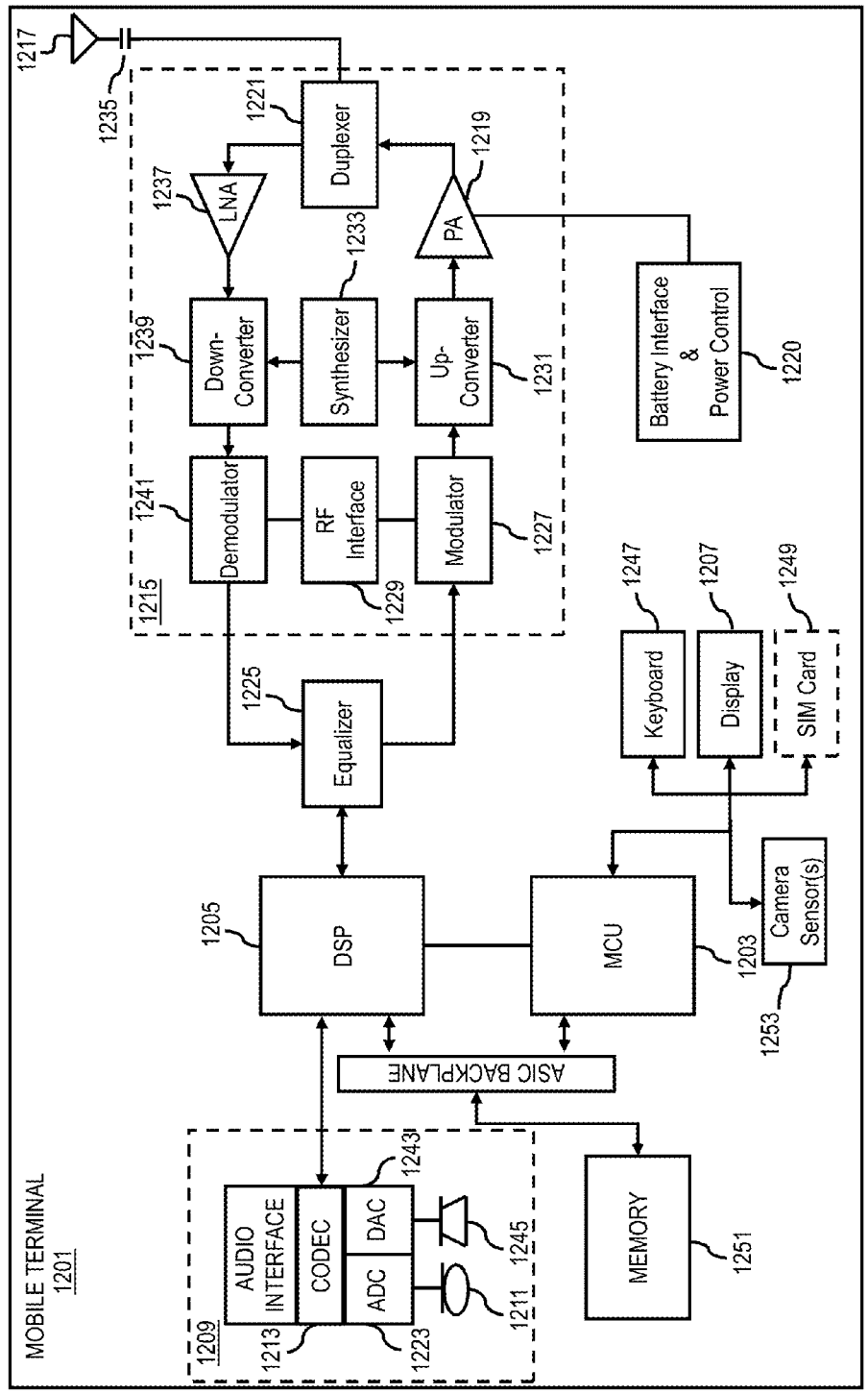
FIG. 12 is a diagram of a mobile terminal (e.g., handset) that can be used to implement an embodiment of the invention.

FIG. 12 is a diagram of exemplary components of a mobile terminal (e.g., handset) for communications, which is capable of operating in the system of FIG. 1A, according to one embodiment. In some embodiments, mobile terminal 1201, or a portion thereof, constitutes a means for performing one or more steps of transforming curvature values into bin values for comprehensible description. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile terminal functions that perform or support the steps of transforming curvature values into bin values for comprehensible description. The display 1207 includes display circuitry configured to display at least a portion of a user interface of the mobile terminal (e.g., mobile telephone). Additionally, the display 1207 and display circuitry are configured to facilitate user control of at least some functions of the mobile terminal. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile terminal 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203 which can be implemented as a Central Processing Unit (CPU).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile terminal 1201 to transform curvature values into bin values for comprehensible description. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the terminal. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile terminal 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable storage medium known in the art. The memory device 1251 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1249 carries, for instance, important information, such as the cellular phone number, the carrier supplying service, subscription details, and security information. The SIM card 1249 serves primarily to identify the mobile terminal 1201 on a radio network. The card 1249 also contains a memory for storing a personal telephone number registry, text messages, and user specific mobile terminal settings.

Further, one or more camera sensors 1253 may be incorporated onto the mobile station 1201 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   receiving, by an apparatus, a plurality of sample curvature values of a road section collected by sensors carried by vehicles traveling via the road section;
   applying, by the apparatus, at least one transformation function to the sample curvature values to transform the sample curvature values into one or more bin values;
   binning, by the apparatus, the sample curvature values into one or more respective bins based, at least in part, on the one or more continuous bin values;
   (1) initiating, by the apparatus, a storage or a transmission of the one or more bin values, (2) processing, by the apparatus, the one or more bin values in the respective one or more bins to determine statistical information for the respective one or more bins, or a combination thereof;
   initiating, by the apparatus, an inverse transformation of the statistical information, the one or more bin values, or a combination thereof back into curvature values mapping the road section; and
   initiating, by the apparatus, a navigation presentation on a user interface including the road section mapped based on the curvature values mapping the road section.

2. A method of claim 1, wherein the one or more bin values include, at least in part, one or more continuous bin values.

3. A method of claim 1, further comprising:
   determining an integer portion of the one or more bin values, wherein the binning of the one or more bin values into the one or more respective bins is based, at least in part, on the integer portion.

4. A method of claim 1, further comprising:
determining a floating value portion of the one or more bin values; and
processing the floating value portion to determine the statistical information.

5. A method of claim 1, wherein the statistical information includes, at least in part, one or more standard deviations.

6. A method of claim 1, wherein the statistical information includes, at least in part, an accuracy of the sample curvature values.

7. A method of claim 1, further comprising:
transforming a sign of the sample curvature values that represent a substantially straight segment,
wherein the binning of the one or more bin values associated with the substantially straight segment is based, at least in part, on the transformation of the sign.

8. A method of claim 1, further comprising:
determining the at least one transformation function, one or more parameters for the at least one transformation function, or a combination thereof to cause, at least in part, an even distribution of the one or more bin values over the one or more respective bins with respect to one or more distribution criteria.

9. A method of claim 8, further comprising:
determining the even distribution of the one or more bin values based, at least in part, on a logarithmic scale.

10. A method of claim 1, further comprising:
determining the at least one transformation function, one or more parameters for the at least one transformation function, or a combination thereof to result in a specified range of the one or more respective bins,
wherein the one or more parameters include, at least in part, a scale parameter, an offset parameter, or a combination thereof.

11. An apparatus comprising:
at least one processor; and
at least one memory including computer program code for one or more programs,
the at least one memory and the computer program code configured to, with the at least one processor, cause the apparatus to perform at least the following,
receive a plurality of sample curvature values of a road section collected by sensors carried by vehicles traveling via the road section;
apply at least one transformation function to the sample curvature values to transform the sample curvature values into one or more bin values;
bin the sample curvature values into one or more respective bins based, at least in part, on the one or more continuous bin values;
(1) initiate a storage or a transmission of the one or more bin values, (2) process the one or more bin values in the respective one or more bins to determine statistical information for the respective one or more bins, or a combination thereof;
initiate an inverse transformation of the statistical information, the one or more bin values, or a combination thereof back into curvature values mapping the road section; and
initiate a navigation presentation on a user interface including the road section mapped based on the curvature values mapping the road section.

12. An apparatus of claim 11, wherein the one or more bin values include, at least in part, one or more continuous bin values.

13. An apparatus of claim 11, wherein the apparatus is further caused to:
determine an integer portion of the one or more bin values,
wherein the binning of the one or more bin values into the one or more respective bins is based, at least in part, on the integer portion.

14. An apparatus of claim 11, wherein the apparatus is further caused to:
determine a floating value portion of the one or more bin values; and
process the floating value portion to determine the statistical information.

15. An apparatus of claim 11, wherein the statistical information includes, at least in part, one or more standard deviations.

16. An apparatus of claim 11, wherein the statistical information includes, at least in part, an accuracy of the sample curvature values.

17. An apparatus of claim 11, wherein the apparatus is further caused to:
transform a sign of the sample curvature values that represent a substantially straight segment,
wherein the binning of the one or more bin values associated with the substantially straight segment is based, at least in part, on the transformation of the sign.

18. A non-transitory computer-readable storage medium carrying one or more sequences of one or more instructions which, when executed by one or more processors, cause an apparatus to at least perform the following steps:
receiving a plurality of sample curvature values of a road section collected by sensors carried by vehicles traveling via the road section;
applying at least one transformation function to the sample curvature values to transform the sample curvature values into one or more bin values;
binning the sample curvature values into one or more respective bins based, at least in part, on the one or more continuous bin values;
(1) initiating a storage or a transmission of the one or more bin values, (2) processing the one or more bin values in the respective one or more bins to determine statistical information for the respective one or more bins, or a combination thereof;
initiating an inverse transformation of the statistical information, the one or more bin values, or a combination thereof back into curvature values mapping the road section; and
initiating a navigation presentation on a user interface including the road section mapped based on the curvature values mapping the road section.

19. A non-transitory computer-readable storage medium of claim 18, wherein the one or more bin values include, at least in part, one or more continuous bin values.

20. A non-transitory computer-readable storage medium of claim 18, wherein the apparatus is further caused to:
determine an integer portion of the one or more bin values,
wherein the binning of the one or more bin values into the one or more respective bins is based, at least in part, on the integer portion.

* * * * *